United States Patent
Plangetis

[19]
[11] Patent Number: 5,951,170
[45] Date of Patent: Sep. 14, 1999

[54] TAPERED RESILIENT SLEEVE BEARING ASSEMBLY

[75] Inventor: Gus F. Plangetis, Annapolis, Md.

[73] Assignee: The United States of America as represented by the Secretary of the Navy, Washington, D.C.

[21] Appl. No.: 09/054,390

[22] Filed: Apr. 3, 1998

[51] Int. Cl.⁶ .................................................. F16C 17/02
[52] U.S. Cl. .......................... 384/219; 384/272; 384/274
[58] Field of Search ..................................... 384/219, 218, 384/272, 274, 273

[56] References Cited

U.S. PATENT DOCUMENTS 3,144,919  8/1964  Foote et al. .
3,372,960  3/1968  Fisher .
3,762,240  10/1973  Adams ........................................ 384/272
4,057,304  11/1977  Gaines et al. .
4,121,813  10/1978  Inuzuka .
4,939,827  7/1990  Iizuka .
5,011,306  4/1991  Martinie ..................................... 384/272

Primary Examiner—Lenard A. Footland
Attorney, Agent, or Firm—Jacob Shuster

[57] ABSTRACT

At least two rigid segments of a tapered bearing sleeve are interconnected by deformable elastomeric sections for rotational support of a shaft or pin about a fixed axis established within a housing into which the bearing sleeve is inserted and held therein by an adjustment closure ring under axial pressure of a spring through which radial clearance between the sleeve segments and the shaft varied during transient loading of the shaft, is minimized to reduce vibrational noise and wear.

10 Claims, 2 Drawing Sheets

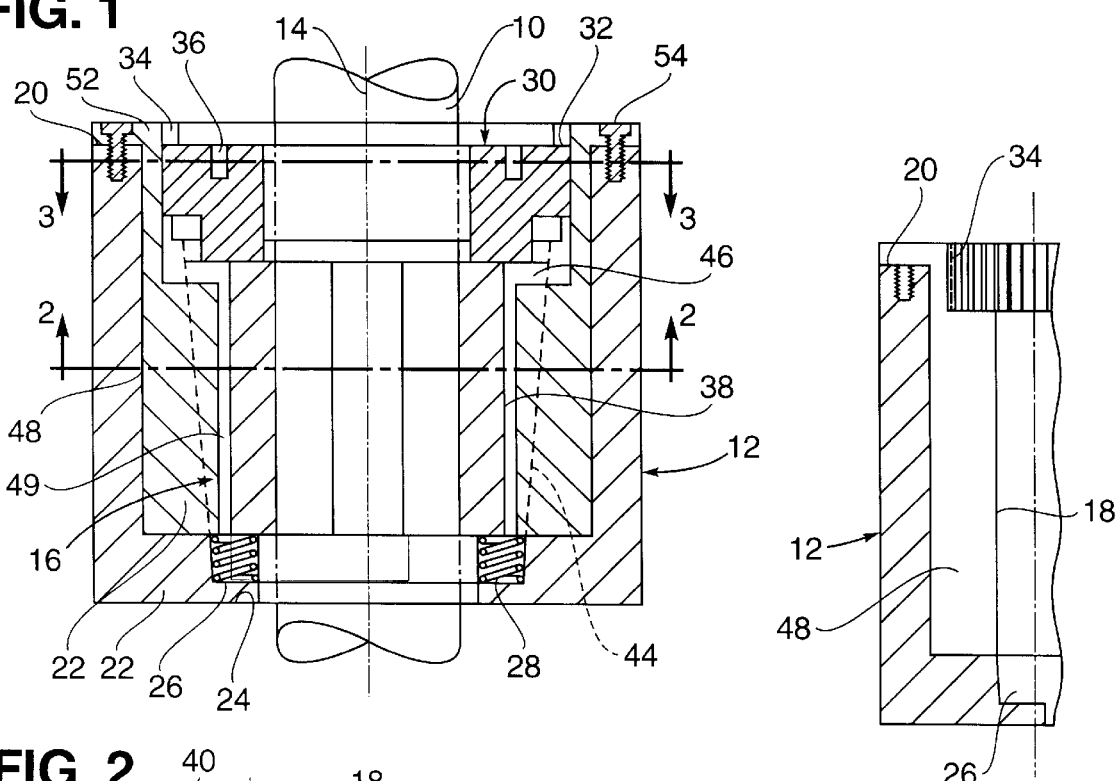
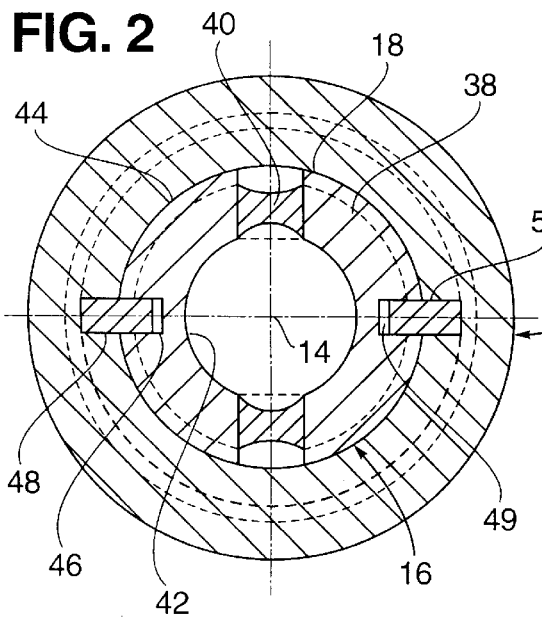
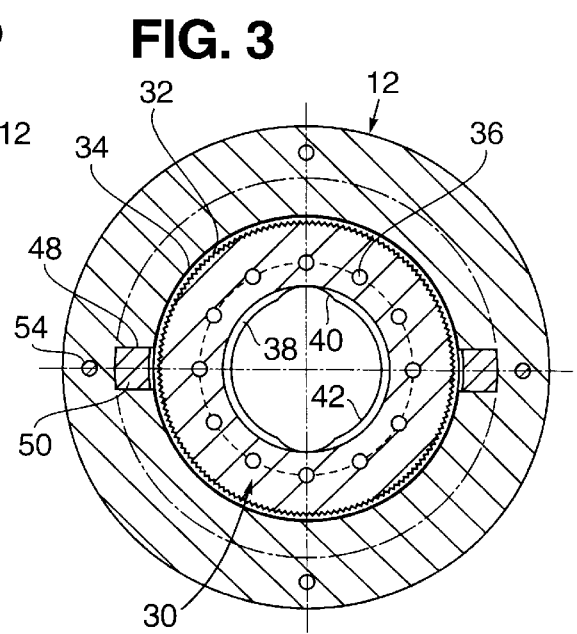

TAPERED RESILIENT SLEEVE BEARING ASSEMBLY

The present invention relates in general to the provision of bearings for rotatable elements, such as shafts and pins in various linkage arrangements and mechanisms.

BACKGROUND OF THE INVENTION

Elastomeric sleeve types of resilient bearings are generally well known in the art as disclosed for example in U.S. Pat. Nos. 3,144,919, 3,372,960, 4,057,304 and 4,121,813. The exertion of adjusted axial spring pressure on a sleeve bearing is also disclosed in U.S. Pat. No. 3,144,919 to Foote et al. In each of the foregoing patented bearing arrangements the elastomeric material of a bearing sleeve is in interfitted contact with a rotationally supported shaft or in the case of U.S. Pat. No. 4,121,813 to Inuzuka confined for contact with a rigid cylindrical sleeve for vibration control purposes. The use of an elastomeric sleeve bearing having an externally tapered shape to accommodate its installational insertion into a housing is disclosed in U.S. Pat. No. 4,939,827 to Inuzuka. However, insertion is associated with press-fitting contact of the bearing sleeve directly with the housing according to the Iizuka patent.

It is an important object of the present invention to provide a bearing assembly through which a small operating clearance is established, as well as to provide for future adjustability in order to maintain operational effectiveness. In accordance with such objective, a bearing assembly having a rotation supporting sleeve is made resilient by use of elastomeric material without its direct contact with rigid surfaces so as to so as to minimize bearing clearance under an adjusted axial bias and thereby reduce vibration noise. Also in accordance with the foregoing objective, additional objects of the present invention include enhancement of bias adjustment under intermittent or transient loading without detracting from facilitated bearing installation and replacement of bearing parts.

SUMMARY OF THE INVENTION

In accordance with the present invention, the non-rotatable tapered sleeve of a bushing type of bearing assembly on which axial spring pressure is exerted following adjusted installation within the bearing housing, is rendered resilient by use of deformable elastomeric connectors between at least two rigid segments of the tapered sleeve through which a bearing bore extends about a cylindrical shaft or pin for rotational support with radial clearance varied under intermittent loading. The elastomeric connectors having radially inner arcuate surfaces exposed to the bore exert circumferential pressures on the rigid sleeve segments which are thereby maintained biased against the housing during adjustment as well as to provide proper operational clearance. The connector surfaces between the rigid sleeve segments extend radially outward of the bore so as accommodate deformation of the connectors under loading without contact with the shaft or pin within the bore. Loading of the resilient sleeve bearing assembly is preregulated to minimize vibration producing effects such as noise and wear by externally effected positioning of a cover ring enclosing the bearing assembly within the housing to adjust the axial spring bias on the bearing assembly. An additional benefit associated with the foregoing bearing arrangement is the ability to extend its operational life by adjustment for proper clearance when excessive wear occurs.

BRIEF DESCRIPTION OF THE DRAWING

A more complete appreciation of the invention and many of its attendant advantages will be readily appreciated as the same becomes better understood by reference to the following detailed description when considered in connection with the accompanying drawing wherein:

FIG. 1 is a side section view through an installed bearing assembly, in accordance with one embodiment;

FIGS. 2 and 3 are transverse section views respectively taken substantially through planes indicated by section lines 2—2 and 3—3 in FIG. 1;

FIG. 4A is a partial side section view of the bearing assembly housing, as shown in FIG. 1, without the bearing assembly installed therein;

DETAILED DESCRIPTION OF THE PREFERRED EMBODIMENTS

Figure 4B:
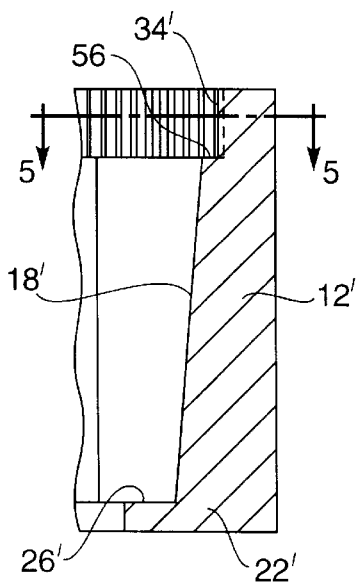
FIG. 4B is a partial side section view of the bearing assembly housing without the bearing assembly installed therein, in accordance with another embodiment.

Referring now to the drawing in detail, FIGS. 1, 2 and 3 illustrate a rotatable element such as a cylindrical shaft 10 extending through a housing 12 for support during rotation about a fixed axis 14 established within the housing by a bushing type of bearing assembly generally referred to by reference numeral 16. The housing 12 encloses the bearing assembly 16 within a chamber formed by a cross-sectionally circular tapered surface 18 as shown in FIG. 4A that extends from one axial end 20 of the housing to an end wall 22 having an opening 24 through which the shaft 10 projects as shown in FIG. 1. The end wall 22 of the housing forms an annular seat 26 for a coil spring assembly 28 which is thereby positioned to exert an axial bias on one axial end of the bearing assembly 16 when confined to the housing chamber by a cylindrical closure ring 30. The other axial end of the bearing assembly opposite spring assembly 28 is accordingly engaged by the closure ring 30 through which the shaft 10 extends.

As shown in FIGS. 1 and 3, the closure ring 30 has a radially outer screw threaded portion 32, threadedly received within an internally threaded end portion 34 of the housing 12. The closure ring 30 is thereby adjustably positioned by angular displacement to vary axial pressure exerted on the bearing assembly 16 at one axial end by the bias of the aforementioned spring assembly 28. Circumferentially spaced holes 36 are formed in the closure ring 30 for receiving projections on a generally known spanner tool through which angular adjustment of the closure ring 30 may be externally effected.

With continued reference to FIG. 2, the bearing assembly 16 in the disclosed embodiment has a tapered shape formed by at least two rigid bearing sleeve segments 38 bonded to deformable connectors 40. The sleeve segments 38 thereby form a cylindrical bore defined by radially inner surfaces 42 positioned about the outer cylindrical surface of shaft 10 to be rotationally supported. The deformable connectors 40, made of an elastomeric material, maintain the rigid sleeve segments 38 of the bearing assembly in circumferentially spaced relation to each other to establish radial clearance of surfaces 42 relative to the shaft 10 under the bias of spring 28 that is varied by adjustable positioning of the closure ring 30 as aforementioned.

The rigid bearing sleeve segments 38 also form a radially outer tapered surface 44 to accommodate and facilitate installational insertion and replacement of the bearing assembly 16 into and out of the housing 12. Such outer tapered surfaces 44 of segments 38 are also formed with keyway slots 46 as shown in FIGS. 1 and 2 to accommodate a key arrangement for preventing rotational displacement of the bearing assembly within the housing 12. The keyway slots 46 are circumferentially positioned midway between the deformable elastomeric connectors 40 which have radially inner arcuate surfaces that extend radially outwardly from the bore formed by surfaces 42 so as to avoid contact with the shaft 10 in response to deformation of the connectors 40 under stress due to forces exerted axially on the tapered sleeve segments 38 of the bearing assembly by the threaded closure ring 30. The elastomeric material of the connectors 40 under such stress are squeezed circumferentially to maintain the required operational clearance between the bearing assembly and the shaft 10.

The keyway slots 46 in the sleeve segments 38 of the bearing assembly 16 are in alignment with keyway slots 48 formed in the housing 12 so as to receive keys 50 which extend radially between the keyway slots 46 and 48 to prevent rotational displacement of the bearing assembly. Toward that end, each key 50 has a flange 52 externally fastened to the end 20 of the housing by screws 54, as shown in FIG. 1, after the bearing assembly is fully inserted into the housing. Each key 50 when fastened to the housing is fully seated within a slot 48 and extends therefrom radially into an aligned keyway slot 46 leaving a radially inner gap 49 therein to allow for axial displacement during transient loading of the shaft and adjustment.

Figure 5:
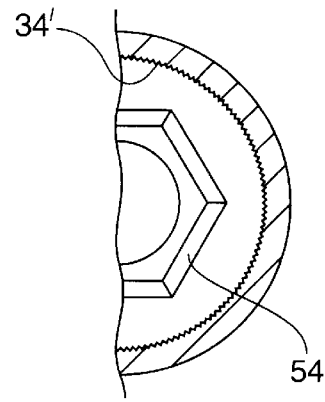
FIG. 5 is a top section view taken substantially through a plane indicated by section line 5—5 in FIG. 4B.
Figure 6:
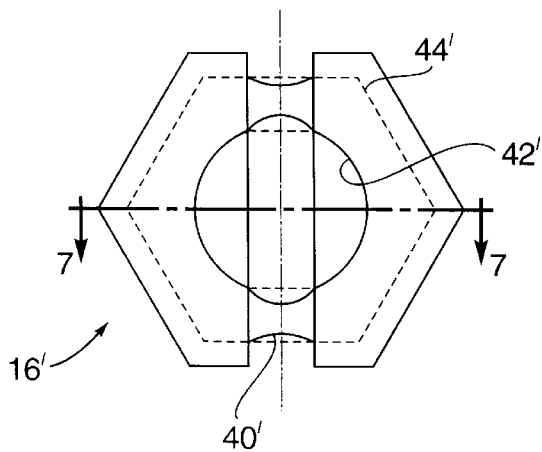
FIG. 6 is a top plan view of the bearing assembly to be installed within the housing shown in FIGS. 4B and 5 pursuant to the other embodiment.
Figure 7:
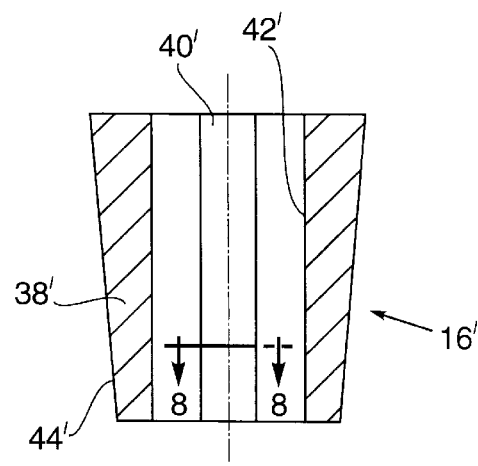
FIG. 7 is a side section view of the bearing assembly shown in FIG. 6, taken substantially through a plane indicated by section line 7—7 in FIG. 6.
Figure 8:
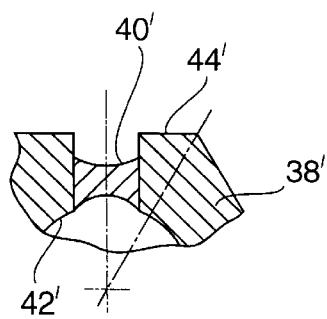
FIG. 8 is an enlarged partial section view taken substantially through a plane indicated by section line 8—8 in FIG. 7.

FIGS. 4B and 5–8 illustrate a modification of the embodiment shown in FIGS. 1–3 and 4A involving a different method of preventing rotational displacement of the bearing assembly which avoids use of keys. The housing 12' as shown in FIGS. 4B and 5 has a cross-sectionally non-cylindrical inner surface 18' of hexagonal, tapered shape to form a chamber receiving a resilient tapered bushing sleeve type of bearing assembly 16' as shown in FIGS. 6, 7 and 8. The housing 12' is provided with a spring seat 26' on its end wall 22' at one axial end opposite the other axial end adapted to threadedly receive a closure ring within an internally threaded end portion 34' in conformance with the previously described embodiment. To avoid use of keys and keyway slots, the tapered hexagonal surface 18' of the housing 12' slidably receives the bearing assembly 16' having a correspondingly tapered outer surface 44' with a hexagonally shaped periphery. The rigid sleeve segments 38' of the bearing assembly, as in the case of the previously described embodiment of FIGS. 1–3 and 4A, are interconnected in circumferentially spaced relation to each other by deformable elastomeric connectors 40' having radially inner surfaces exposed to the shaft receiving bore from which it extends radially outwardly of the radially inner bearing surfaces 42' as shown in FIGS. 7 and 8. By virtue of such elastomeric connectors or 40', the bushing type bearing assembly 16' is thereby rendered effective through its resiliency property and by axial adjustment to minimize radial bearing clearance and reduce adverse vibration generated effects such as noise and wear of parts as in the case of bearing assembly 16 hereinbefore described with reference to FIGS. 1, 2, 3 and 4A.

Obviously, other modifications and variations of the present invention may be possible in light of the foregoing teachings. It is therefore to be understood that within the scope of the appended claims the invention may be practiced otherwise than as specifically described.

What is claimed is:

1. In combination with a bearing assembly supporting an element for rotation about a fixed axis within a housing, adjustment means mounted by the housing in engagement with the bearing assembly for minimizing radial clearance maintained between the bearing assembly and the rotatable element, said bearing assembly including: a resilient bushing having a radially outer tapered surface and a radially inner bore within which said radial clearance is varied relative to the rotatable element in response to axial displacement of the tapered surface of the resilient bushing by the adjustment means along said axis; and means for preventing rotational displacement of the resilient bushing about the axis during said axial displacement thereof.

2. The combination as defined in claim 1 wherein said resilient bushing comprises: at least two rigid sleeve segments on which said tapered surface is formed and deformable connector means bonded to said sleeve segments for yieldably holding thereof in circumferentially spaced relation to each other.

3. The combination as defined in claim 2 wherein said deformable connector means includes elastomeric sections of the resilient bushing between the sleeve segments, each of said elastomeric sections having a radially inner surface portion projecting radially outwardly from the radially inner bore to accommodate deformation of the elastomeric sections without contact with the rotatable element.

4. The combination as defined in claim 3 wherein said adjustment means includes: a spring seated in the housing in engagement with the rigid sleeve segments of the resilient bushing; and closure means mounted by the housing for holding the resilient bushing therein under adjusted axial bias of said spring.

5. The combination as defined in claim 4 wherein said means for preventing rotational displacement of the resilient bushing includes: a keyway formed within each of said rigid sleeve segments; and axially elongated keys fixed to the housing and respectively received within each of said keyways with radial gaps to accommodate said axial displacement of the resilient bushing.

6. The combination as defined in claim 2 wherein said adjustment means includes: a spring seated in the housing in engagement with the rigid sleeve segments of the resilient bushing; and closure means mounted by the housing for holding the resilient bushing therein under adjusted axial bias of said spring.

7. The combination as defined in claim 2 wherein said means for preventing rotational displacement of the resilient bushing includes: a keyway formed within each of said rigid sleeve segments; and axially elongated keys fixed to the housing and respectively received within each of said keyways with radial gaps to accommodate said axial displacement of the resilient bushing.

8. The combination as defined in claim 2 wherein said means for preventing rotational displacement of the resilient bushing includes: formation of a non-cylindrical periphery on the tapered surface of the sleeve segments received within the housing.

9. A bearing assembly for a rotatable element within a housing, comprising: a bushing having a radially inner bore within which the rotatable element is supported; and means biasing the bushing for axial displacement within the housing relative to the rotatable element; said bushing including: at least two rigid sleeve segments within which the inner bore is formed and deformable connector means interconnecting said rigid sleeve segments for yieldably holding thereof in circumferentially spaced relation to each other within the housing.

10. The bearing assembly as defined in claim 9, wherein said deformable connector means includes elastomeric sections between the rigid sleeve segments, each of said elastomeric sections having a radially inner surface portion projecting radially outwardly from the radially inner bore to accommodate deformation of the elastomeric sections without contact with the rotatable element.

* * * * *